United States Patent [19]

Ruchser

[11] Patent Number: 4,685,383

[45] Date of Patent: Aug. 11, 1987

[54] SEAL FOR RODLESS CYLINDER WITH SHUTTLE PISTON

[75] Inventor: Erich Ruchser, Kernen, Fed. Rep. of Germany

[73] Assignee: Herion-Werke KG, Fellbach, Fed. Rep. of Germany

[21] Appl. No.: 765,268

[22] Filed: Aug. 13, 1985

[30] Foreign Application Priority Data

Aug. 13, 1984 [DE] Fed. Rep. of Germany ....... 3429783

[51] Int. Cl.[4] ............................................. F01B 29/00
[52] U.S. Cl. .................................. 92/88; 277/DIG. 7
[58] Field of Search ...................... 92/88; 277/DIG. 7

[56] References Cited

U.S. PATENT DOCUMENTS

| | | | |
|---|---|---|---|
| 3,019,813 | 2/1962 | Dommann | 92/88 X |
| 4,373,427 | 2/1983 | Garlapaty et al. | 92/88 |
| 4,376,543 | 3/1983 | Sakagami | 277/DIG. 7 X |
| 4,481,869 | 11/1984 | Garlapaty | 277/DIG. 7 X |
| 4,519,297 | 5/1985 | Lipinski | 92/88 |
| 4,545,290 | 10/1985 | Lieberman | 92/88 |

FOREIGN PATENT DOCUMENTS

2162572 12/1976 Fed. Rep. of Germany .
3124878 12/1982 Fed. Rep. of Germany .......... 92/88
8302306 7/1983 PCT Int'l Appl. ..................... 92/88

Primary Examiner—Robert E. Garrett
Assistant Examiner—George Kapsalas
Attorney, Agent, or Firm—Henry M. Feiereisen

[57] ABSTRACT

The invention relates to a shuttle piston cylinder whose axially moving piston carries a power transmission element projecting out through a longitudinal slot in the wall of the cylinder barrel. A flexible seal band looped through the power transmission element seals off the slot in the parts thereof between the ends of the cylinder and the piston. The seal band is made in one piece and has a sealing lip that causes a sealing effect when acted upon by internal pressure. Furthermore the seal band has beads that are able to lock into the longitudinal slot of the barrel and hold the band therein and furthermore act to keep out dirt from the cylinder. Preferably the flexible band is reinforced by a steel band that is partly embedded in the seal band or is bonded by vulcanization onto the inner face thereof.

20 Claims, 13 Drawing Figures

SEAL FOR RODLESS CYLINDER WITH SHUTTLE PISTON

BACKGROUND OF THE INVENTION.

1. Field of the Invention

The invention relates to cylinders having a shuttle piston, i.e. rodless axially moving piston, having a power transmission element projecting from said piston through a longitudinal slot in the wall of the cylinder barrel, and a flexible seal band which serves to seal the longitudinal slot and is guided under and through the power transmission element.

2. Description of the Prior Art

The German Pat. No. 2,162,572 discloses a cylinder with a shuttle piston of this sort. This cylinder has a seal band made of magnetizable steel. Along the cylinder a row of magnets is placed to retain the seal band in a groove in the wall of the longitudinal slot and keep the seal band from sagging into the space within the cylinder. However, the use of magnets makes this known design complex and the design does not perform satisfactorily because the longitudinal slot is not so effectively shut off from the outside that it is not possible for dirt to find its way into it.

The German Pat. No. 3,124,878 discloses a shuttle piston cylinder, that uses an inner and an outer seal band both made of elastomeric material. The inner band has a longitudinal rib thereon with wedge faces and the outer band has a longitudinal groove also with wedge faces that are to cooperate with those of the rib. In step with motion of the piston in the cylinder, the rib is continuously guided out of the groove to one side of the piston and on the other side thereof it is moved back into the groove, the wedge faces of the rib loosely interlocking with those of the groove. This design of the seal band does, it is true, make possible an external sealing action (viz. To keep out material from the outside) as well and the inner seal band is kept from sagging into the space inside the cylinder, but however this is only possible with two seal bands, that have to be continuously engaged and disengaged with each other. Since the seal bands are made of an elastomeric synthetic material, the strength and stability of the unit are relatively poor.

SUMMARY OF THE INVENTION

The general purpose of the invention is to put an end to these shortcomings.

More specifically, one object of the invention is to design a shuttle (i.e. being able to be simply assembled, effectively seals the longitudinal slot of the cylinder from the inside and the outside. Or putting it differently it is to prevent the ingress of dirt or the like into the space inside the cylinder from the outside and prevents the escape of fluid from inside the cylinder.

In keeping with a further object of the invention, the design is such that the band is reliably positioned in the longitudinal slot even when the cylinder is not under pressure.

In order to attain these and other objects, the seal band has longitudinal beads on its outer surface, which are detachably held at the edges of the longitudinal slot.

The beads may furthermore overlap the edges of the longitudinal slot on the outside or lock into longitudinal grooves in the side faces of the longitudinal slot. In keeping with a further possible form of the invention, the cross section of the longitudinal slot widens towards the outside and the beads are in the form of outwardly diverging wings that rest against the side faces of the longitudinal slot.

Preferably, the sealing lip of the seal band has a trapezoid cross section with a breadth decreasing in an outward direction and the beads may be directly joined up with the sealing lip.

The seal band is made of elastomeric synthetic material is reinforced by a steel band that is at least in part embedded in the seal band. In accordance with a further form of the invention, the steel band is attached to the inner surface of the seal band, more specially by vulcanizing.

The power transmission element is preferably designed with a spreading pin behind and in front of it in the direction of the cylinder to splay out the longitudinal edges of the seal band and it may further have oblique driving or cam faces in order to press together the longitudinal edges of the seal band before being moved into the longitudinal slot.

Preferably, the cylinder barrel has a guide groove on each side of its longitudinal slot, the power transmission element fitting into such guide grooves and being guided therein.

BRIEF DESCRIPTION OF THE DRAWING

The above and other objects, features and advantages of the present invention will now be described in more detail with reference to the accompanying drawing in which.

DESCRIPTION OF THE PREFERRED EMBODIMENTS

Figure 1:
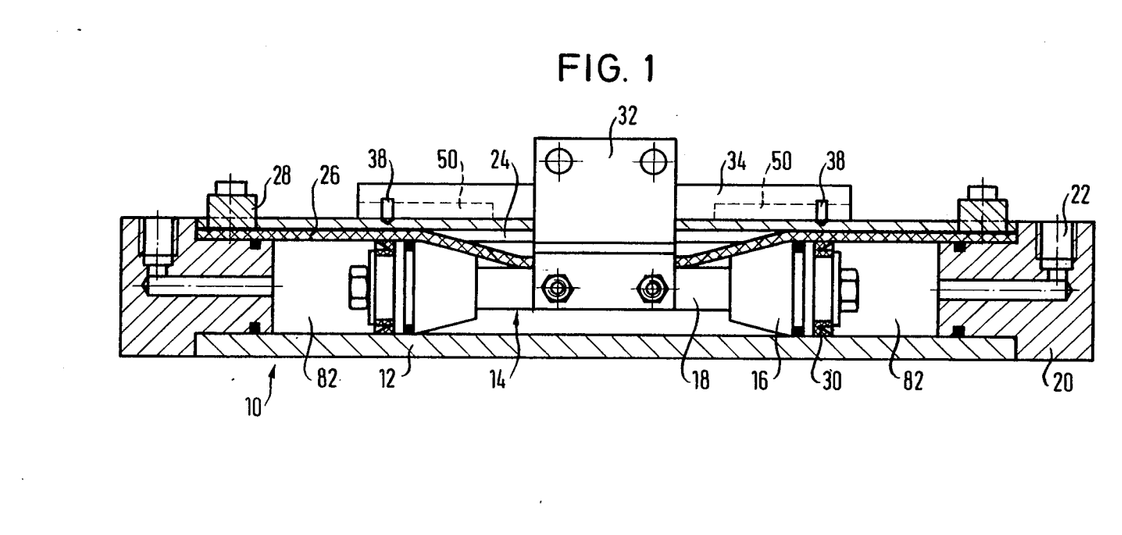
FIG. 1 is a diagrammatic longitudinal section of a cylinder provided with a shuttle or reciprocating piston and a seal band according to the invention.

The shuttle piston pressure actuator 10 to be seen in FIG. 1 has a cylindrical barrel or wall 12 with an inner space in which a piston 14 reciprocates in axial direction and is guided for such movement. The piston 14 includes two piston heads 16 joined together by a bridge 18.

The cylinder barrel 12 is closed at its two axial ends by respective end plates 20 which accommodate a connection 22 for supply and discharge of a pressure fluid.

The barrel 12 has a longitudinal slot 24 extending in axial direction along the entire length of the cylinder barrel 12 and is sealed by a flexible seal band 26 attached to the end plates 20 by respective clamps 28.

A power transmission element 32 is fixed, for example by screws, on the bridge 18 of the reciprocating piston 14 and projects radially beyond the barrel 12 through the longitudinal slot 24, with a clearance on both its sides, so that it may be connected with a device to be driven by the cylinder actuator 10, such device not being shown.

Figure 2:
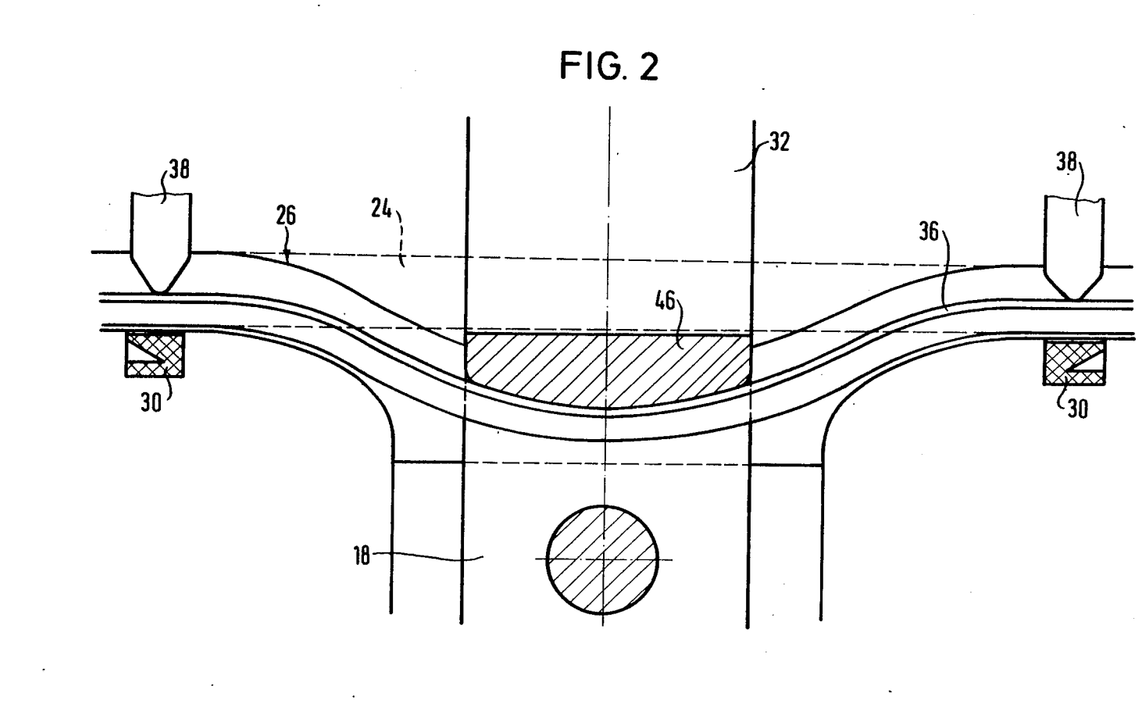
FIG. 2 shows the seal band during its traversing of the power transmission element.

As may be seen from FIG. 1 and on a larger scale from FIG. 2, the seal band 26 is guided to run through the power transmission element 32. And as may be further seen from this figure, the seal band has moved out of the longitudinal slot 24 in the part between the piston heads 16, while however in the parts between the end plates 20 and the piston heads 16 the seal band is kept within the longitudinal slot 24 and it is pressed thereinto by the piston heads or rather their seals 30 when the piston is reciprocating, as will be described later herein.

In FIG. 2 the reader will be able to see part of the power transmission element 32 on a larger scale together with the seal band 26 passing through it.

In FIG. 2 only the seals 30 of the respective piston heads 16 will be seen and it will be clear from FIG. 2 that the seal band 26 extends in the longitudinal slot 24 from the cylinder ends as fas as the vicinity of the piston seals 30, whereas between the piston seals 30 it is guided between a heel 46 of the power transmission element 32 and the bridge 18 of the piston 14, i.e. outside the longitudinal slot 24.

The power transmission element 32 is furnished with a guide plate 34, that is made integrally therewith or may be fixed to it. This guide plate 34 is represented diagrammatically in FIG. 3 in plan view, the FIG. furthermore showing a section of the seal band 26 in plan view.

Figure 3:
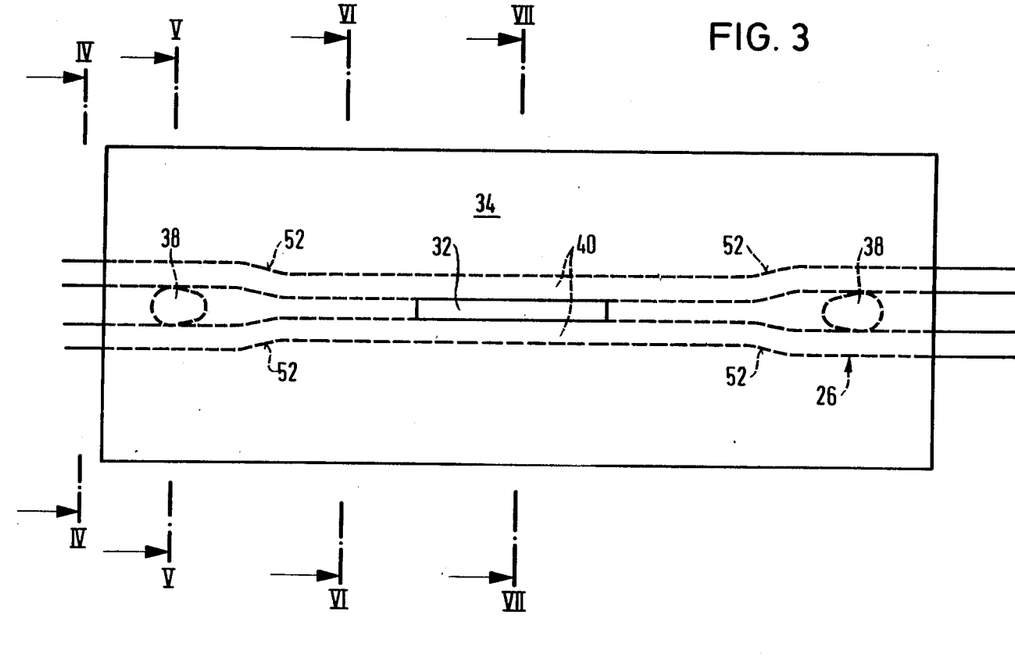
FIG. 3 is a diagrammatic plan view of the power transmission element with a view of the seal band.
Figure 4:
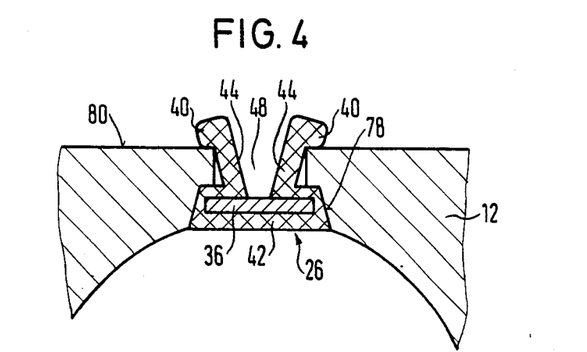
FIG. 4 is a cross sectional view of the cylinder taken along the line IV—IV of FIG. 3.

FIG. 4 shows the seal band 26 in section on the line IV—IV of FIG. 3 in a position in which the seal band is still fully within the longitudinal slot 24 of the cylinder barrel 12.

The seal band 26 to be seen in FIG. 4 consists of the sealing lip 42 in the limited sense of the word and which has a trapezoid cross section so that it becomes narrower in an outward direction from the interior of the barrel 12. This trapezoid sealing lip 42 is mounted in a corresponding trapezoid groove 78 in the said barrel 12, such groove 78 being a part of the longitudinal slot 24. On the sealing lip 42 there are two longitudinally running ribs or beads 44 on the outside, such ribs merging with longitudinal beads 40, that in the working example of FIG. 4 overlap the outer face 80 of the barrel 12 in the circumferential direction thereof. The seal band 26 is made of a flexible elastic material and the ribs 44 are best designed to run obliquely outwards while becoming wider so that there will be a generally converging inner space 48 between the said ribs 44.

The beads 40 are therefore retained in their position to be seen in FIG. 4 both by their form and the form of the ribs 44 and furthermore by the natural elasticity of the material of the seal band 26. In this position the longitudinal slot is sealed off on the inside by the sealing lip 42 and on the outside by the beads 40.

The sealing lip 42 is retained in its position in the groove 78 of the barrel 12 by the beads 40 and by the pressure of the fluid under pressure in the pressure spaces 92 of the cylinder 10 it is pressed furthermore into the groove 78.

However, when the pressure spaces 82 are not under pressure the seal band 26 kept securely in place in the longitudinal slot of the barrel 12 and for this reason is kept from sagging into the space inside the cylinder.

The inner end face of the sealing lip 42 may have a form (not shown here) of cross section adapted to the form of cross section of the inner face of the barrel 1. However in the present case, as may be seen form FIG. 4, it is best made even or flat so that the sealing lip deforms slightly when the circular piston heads 16 run over it and for this reason is pressed to a greater extent into the groove 78.

Figure 8:
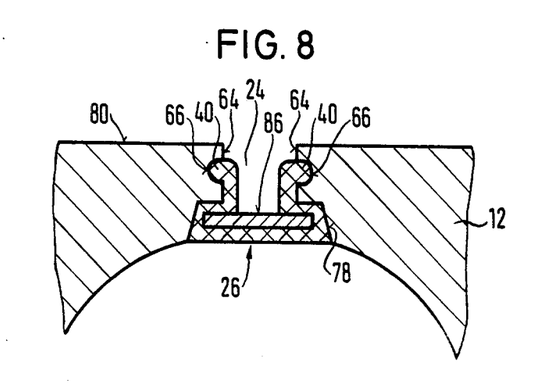
FIGS. 8 to 11 are schematic illustrations of further embodiments of the seal band.
Figure 9:
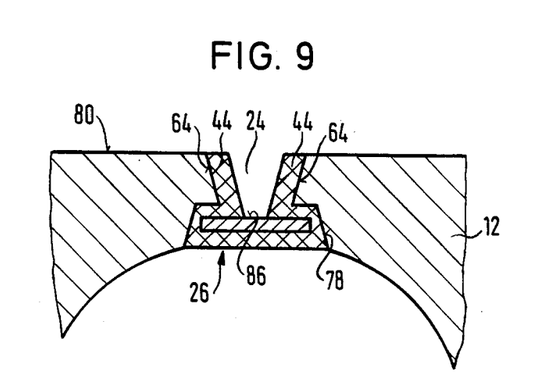

The seal band 26 is, as may also be seen from FIG. 4, preferably furnished with a reinforcement in the form of a flexible steel band 36, that in the embodiment of FIG. 4 and also in those of FIGS. 8 and 9 is embedded in the seal band 26, for example by being vulcanized therein, although however on the outside there is a strip-like surface part of the steel band 26 that is left uncovered and is not concealed by the seal band 26, the purpose of this arrangement being described hereinafter. The steel band 36 increases the strength of the seal band 26.

Figure 5:
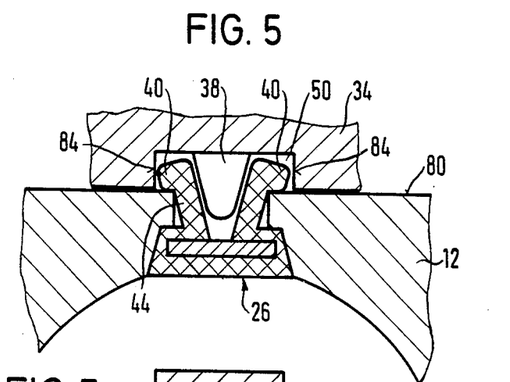
FIG. 5 is a cross sectional view of the cylinder taken along the line V—V of FIG. 3.

FIG. 5 shows a section through the seal band taken on the line V—V of FIG. 3. The band 26 is still fully within the slot of the barrel 12 and its beads overlap the outer face 80 of the barrel. The outer face of the seal band, i.e. its beads, is covered over and overlapped by the guide plate 34, that at its lower face, turned towards the outer face of the barrel, has an axially running recess 50 on each side of the power transmission element 32. At the same distance along the cylinder as the respective position of the piston seals 30 there is, see more specially FIG. 2, a spreading pin 38 behind and in front of the element 32 in the direction of the cylinder, such pin 38 being fixed to the guide plate 34. The pin projects downwards from the guide plate 34 into the recess 50 and then further between the ribs 44 of the seal band 26, as may be seen in FIG. 5. The side faces 84 of the recess 50 are, as may be seen from FIG. 3, designed with driving or cam faces 52 running obliquely inwards so that the breadth of the recess 50 is reduced down to a value not greater than the width of the longitudinal slot 24.

These driving faces 52 have the function of pressing the beads 40 of the seal band 26 towards each other so that they move into the longitudinal slot 24 and the seal band 26 may be guided downwards out of the longitudinal slot 24 and through the element 32. On moving the seal band out of the power transmission element 32 on the other side thereof, the ribs 44 of the seal band ar pressed apart by the spreading pin 38 at the other axial end of the element 32 so that the beads overlap and the outer face 80 of the barrel 12 again and therefore the seal band 26 is taken up in the longitudinal slot 24 again.

Figure 6:
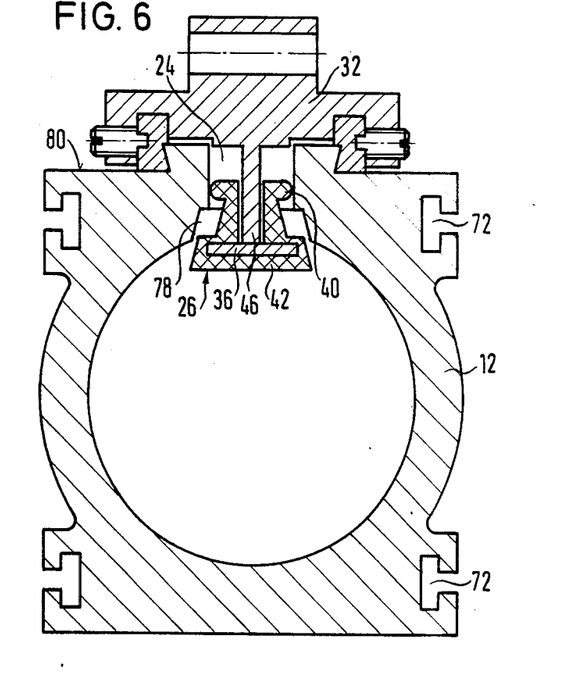
FIG. 6 is a cross sectional view of the cylinder taken along the line VI—VI of FIG. 3.

FIG. 6 is a section through the cylinder barrel 12 taken on the line VI—VI of FIG. 3. In this position the beads 40 of the seal band will be seen to have already moved into the longitudinal slot 24 (after they have been forced together as explained) and the seal band 26 is guided in a downward direction by the heel 46 of the power transmitting element 32, that takes up a position between the ribs 44 of the seal band, the sealing lip 42 already having come clear of the groove 78. In order to produce good siding properties, the heel 46 runs directly on the steel band 36, that, as we have been able to see, has for this purpose an uncovered strip free of the synthetic resin of the seal band 26 on its outer face.

Figure 7:
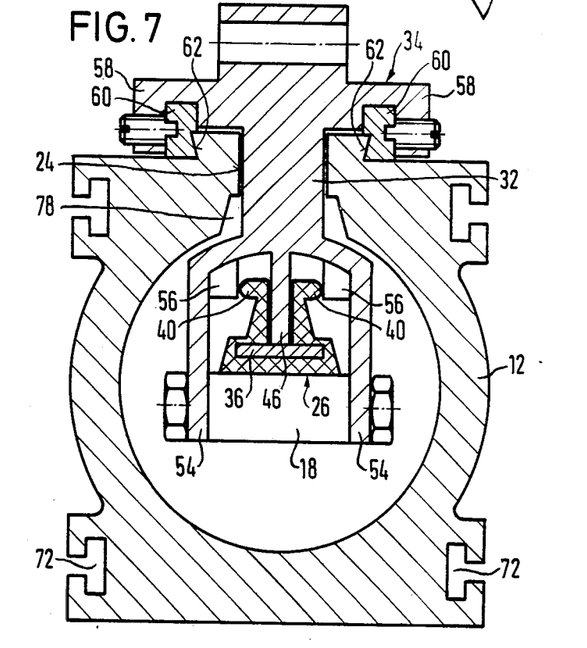
FIG. 7 is a cross sectional view of the cylinder taken along the line VII—VII of FIG. 3.

FIG. 7 is a section through the cylinder barrel 12 taken along the line VII—VII of FIG. 3. This section runs through the middle plane (radial with respect to the cylinder) of the power transmission element 32 and for this reasons goes through the lowest point of the seal band 26.

In this position the seal band has completely emerged from the groove 78 and is radially now between the heel 46 and the bridge 18 of the piston, there being sufficient space between the latter and the seal band, as may be seen from FIG. 2 for example. The beads 40 are kept in their closed or unfolded position by axial shoulders 56, whose spacing is generally equal to the width of the longitudinal slot 24 which are molded on or fixed to the legs 54 of the power transmission element 32. The legs are screwed to the bridge 18 of the piston 14 so that the force is transmitted from the piston via the bridge 18 and the legs 54 to the power transmission element 32.

As may now be seen from FIG. 7, guide rails 58 are formed on the two longitudinal sides of the guide plate 34, such guide rails pointing towards the outer face 80 of the barrel 12 and fitting directly or by way of guide rails 60 into axial longitudinal grooves 62 formed on the barrel so that on the one hand the power transmission element is guided axially on the barrel 12 and on the other hand the barrel 12 is guided by the guide plate 34 so that there is no chance of the longitudinal slot 24 opening out. The guide rails 60 are placed in suitable grooves (not shown in detail) of the guide rails 58 and they are furthermore kept in place by screws, not referenced, so that they may be adjusted.

The FIGS. 8 to 11 show further working examples of the seal band. In the example of the FIG. 8, the beads 40 of the seal band 26 fit into longitudinal grooves 66, that are formed in the side walls 64 of the longitudinal slot 24. The beads 40 therefore are placed within the longitudinal slot 24 and therefore do not overlap the outer face 80 of the barrel 18.

In the working example of FIG. 9 there are no beads and in place thereof there are the ribs 44 in the form of outwardly diverging wings, same resting against side walls 64 of the longitudinal slot 24 that also diverge in the outward direction, as may be seen from FIG. 9. The wings may in this case come to an end flush with the outer face 80 of the cylinder barrel 12 or short of it.

In both working examples the steel band has a free or uncovered part 86 that is not covered over by the plastic material of the seal band so that when the band moves through the power transmission element the heel 46 runs thereon, as has been explained hereinbefore.

Figure 10:
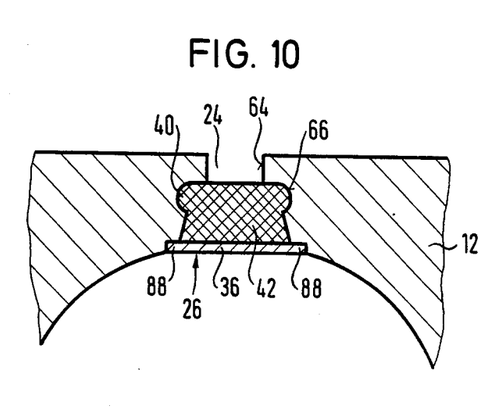

In the embodiment of the invention viewed in FIG. 10, the beads 40 also lock into longitudinal grooves 66, that are formed in the side walls 64 of the longitudinal slot 24. The sealing lip 42, whose cross section is also generally in the form of a trapezoid narrowing in an outward direction, merges directly with the bead 40 in this case, i.e. they are not carried on wings.

However, unlike the case of the other working examples, the steel band 36 is not embedded in the seal band, but is attached to its inner face, more especially by vulanizing. The breadth of the steel band 36 measured in the circumferential direction is somewhat larger than that of the sealing lip 42 so that its longitudinal edges 88 overhang the same and the steel band is received in a suitable groove in the cylinder barrel 12 so that it is flush with the inner wall or face of the barrel 12. The sealing action needed to resist the internal pressure is generally performed by the steel band 36 (and the sealing lip 42), while the sealing action to keep out dirt from the outside and the keying of the sealing band in place in the slot 24 is performed by the beads 40, that lock into the grooves 66.

Figure 11:
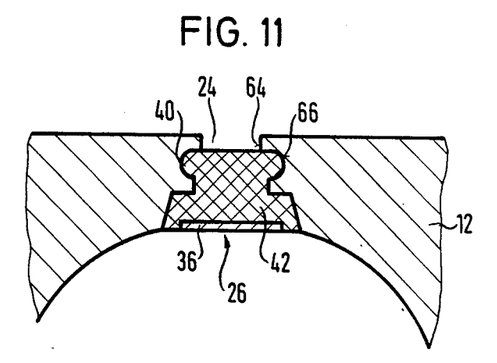

In the working example of the seal band to be seen in FIG. 11 the breadth of the steel band 36 is less than the breadth of the sealing lip 42. The steel band is in this case vulcanized to the lower face of the seal band 26 to be within same and it is covered by the sealing lip 42 on its upper side and on its two longitudinal sides, whereas the lower side of the steel band 336 is uncovered.

The seal of each of the pistons therefore runs only on the steel band 36 (and not on other parts of the seal band) in the embodiment of FIG. 10 and in FIG. 11 it only mainly does so.

Figure 12:
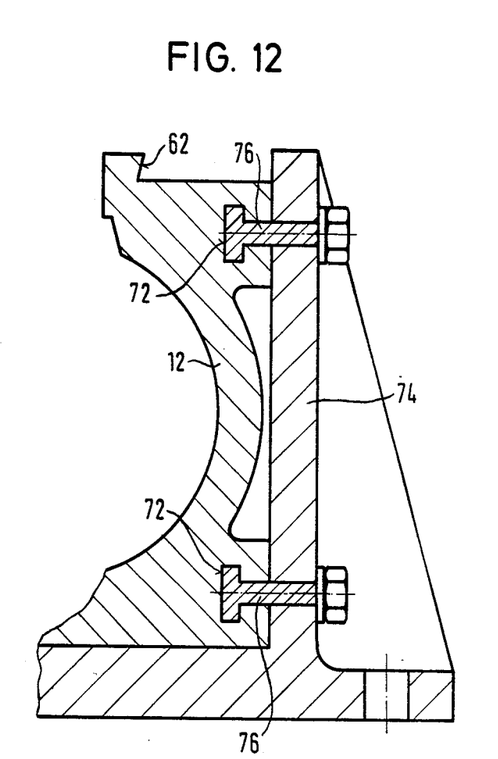
FIG. 12 is a sectional view of a carrier for supporting the cylinder.

FIG. 12 shows in section one half of the cylinder barrel 12 and the way it is attached to a firm support 74. On both its sides the cylinder barrel 12 has two longitudinally running attachment grooves 72, in which suitable threaded pins 76 are set for mounting on a support 74, as for example a channel-section so that the cylinder barrel 12 is surrounded on three sides. In this way a particularly stable mount is produced for the cylinder.

The workings of shuttle cylinder actuators are well known.

In the embodiment described herein, a single integral seal band is used, that performs the function of sealing off the pressure spaces 82 of the cylinder in an outward direction and it is so designed that it keys into or interlocks with the longitudinal slot of the cylinder barrel. Furthermore, the longitudinal slot is sealed off so that it is not fouled by dirt from the outside.

On reciprocation of the piston, and for this reason of the power transmission element with the guide plate 34, the seal band is pressed, in the examples of FIGS. 3 to 7, by the driving faces 52 into the longitudinal slot and then after running through the power transmission element it is spread apart again by the respective spreading pin 38.

The piston heads 16, or rather more the piston seals 30, force the seal band back into the longitudinal slot after it has emerged from it, whereupon the beads again cause the seal band to interlock with the side faces of the longitudinal slot.

In the working example of the seal band of the FIGS. 8 through 11 the driving faces are not needed, seeing that the beads of the seal band are already within the longitudinal slot 24. In the working example of the FIGS. 8 and 9 the spreading pins may be used if desired, whereas in the FIGS. 10 and 11 on the other hand the spreading pins 38 are unnecessary.

Figure 13:
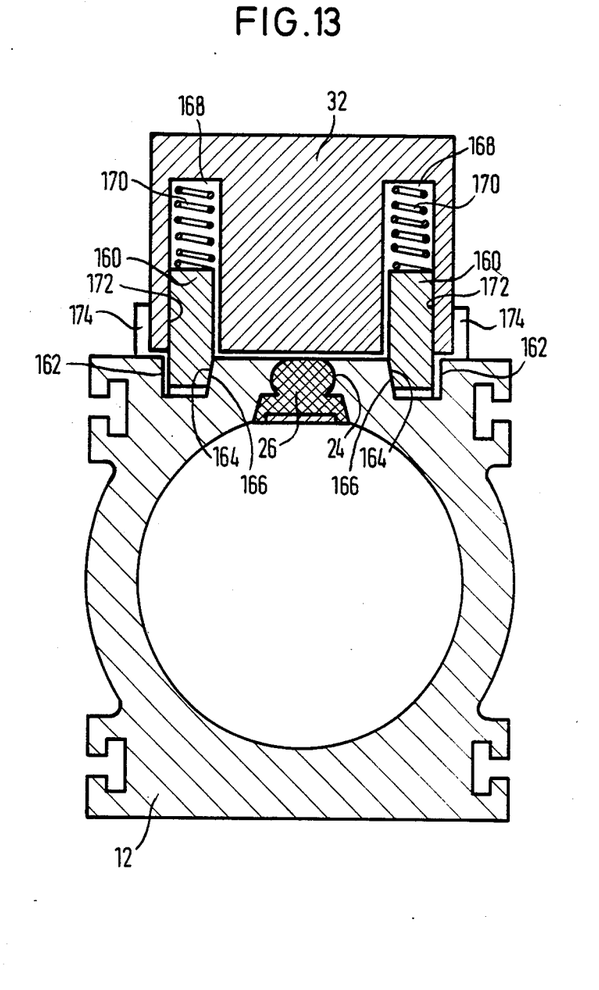
FIG. 13 is a cross sectional view of the cylinder illustrating the guidance of the power transmission element therealong.

The power transmission element 32 to be seen only diagrammatically in FIG. 13 is furnished with guide rails 160, that are placed and supported in longitudinally or axially running sockets 168 of the power transmitting element 32.

As may be seen from FIG. 13, the guide rails 160 fit into longitudinal grooves 162, that are formed on the cylinder barrel 12 on both sides of the longitudinal slot 24.

Each guide rail 160 has a sloping face 164 on the one side of its end fitting into its longitudinal groove 162, such face 164 being turned towards the longitudinal slot 24 and cooperating with a corresponding sloping face 166 of the respective longitudinal groove 162.

The sloping faces 164 and 166 are in constant contact with each other. Each guide rail 160 is acted upon by one or more compression springs 170, that are housed in the sockets 168, to push it towards the respective longitudinal groove 162, vis. The guide rails 160 are pressed by the compression springs 170 into the longitudinal grooves 162.

Since on their back side 172 the guide rails 160 are supported by the corresponding inner face of the socket 168 and therefore by the power transmission element 32, the sloping faces 164 of the guide rails 160 are constantly forced by the compressions prings 170 against the sloping faces 166 of the longitudinal grooves 162, this being responsible for play-free guiding of the power transmission element 32 onthe cylinder barrel 12.

When the sloping faces 164 and 166 become worn, the guide rails 160 are pressed by the compression springs 170 further into the longitudinal grooves 162 so the sloping faces 164 are still kept in contact with the sloping faces 166.

Because the sloping faces 164 of the guide rails 160 are constantly kept in engagement with the sloping faces 166 of the longitudinal grooves 162 the guide barrel 12 is alwyas supported by the guide rails 160 and for this reason by the power transmission element 32, this generally preventing the cylinder barrel 12 from being splayed open, at least to a substantial degree.

As will be seen there is a molding or a sealing rail 174, made for example of felt or the like, on each side of the power transmission element 32 in order to stop the grooves and the guide rails being fouled with dirt. Furthermore they are continuously cleaned by this device. While the invention has been illustrated and described as embodied in a Shuttle Piston Cylinder, it is not intended to be limited to the details shown since various modifications and structural changes may be made without departing in any way from the spirit of my present invention.

What is claimed as new and desired to be protected by Letters Patent is set forth in the appended claims:

1. A cylinder device; comprising:
    a cylinder defining an axis and having a cylinder wall provided with a longitudinal slot extending in axial direction thereof;
    a piston reciprocating in axial direction within said cylinder;
    a power transmission element having one end portion connected to said piston and projecting with its said cylinder wall; and
    a flexible sealing element for sealing said piston against said cylinder wall and being provided along its surface facing away from said piston with longitudinal beads which are detachably arranged with respect to said slot to allow traversing of said power transmission element at a radially inward distance to said cylinder wall, said sealing element being provided with a sealing lip of trapezoid cross section whose side walls taper outwardly wherein said longitudinal beads extend outwardly over the edges of said slot as defined by said cylinder wall to retain said sealing element in position when extending in said slot.

2. A cylinder device as defined in claim 1 wherein said power transmission element is provided at each axial side thereof with inwardly directed cam surfaces to force said beads towards each other before entering said longitudinal slot so as to allow detaching of said sealing element.

3. A cylinder device as defined in claim 1 wherein said sealing element is a seal band of elastic synthetic resin.

4. A cylinder device as defined in claim 1, and further comprising a steel band provided in said sealing element for reinforcing the latter.

5. A cylinder device as defined in clam 4 wherein said steel band is exposed at its surface facing away from said piston, said power transmission element sliding along said exposed surface.

6. A cylinder device as defined in claim 4 wherein said steel band is partly embedded within said sealing element.

7. A cylinder device as defined in claim 6 wherein said steel band has a width and said sealing lip has a width, said width of said sealing lip being smaller than said width of said steel band.

8. A cylinder device as defined in claim 4 wherein said sealing element has an innerside facing said piston, said steel band being attached to said innerside.

9. A cylinder device as defined in claim 8 wherein said steel band is attached to said innerside by vulcanization.

10. A cylinder device; comprising:
    a cylinder defining an axis and having a cylinder wall provided with a longitudinal slot extending in axial direction thereof;
    a piston reciprocating in axial direction within said cylinder
    a power transmission element having one end portion connected to said piston and projecting with its other end portion radially through said slot beyond said cylinder wall; and
    a flexible sealing element for sealaing said piston against said cylinder wall and being provided along its surface facing away from said piston with longitudinal beads which are detachably arranged with respect to said slot to allow traversing of said power transmission element at a radially inward distance to said cylinder wall, said power transmission element being provided at each axial side thereof with inwardly directed cam surfaces to force said beads towards each other before entering said longitudinal slot so as to allow detaching of said sealing element.

11. A cylinder device; comprising:
    a cylinder defining an axis and having a cylinder wall provided with a longitudinal slot extending in axial direction thereof;
    a piston reciprocating in axial direction within said cylinder;
    a power transmission element having one end portion connection to said piston and projecting with its other end portion radially through said slot beyond said cylinder wall;
    a flexible sealing element for sealing said piston against said cylinder wall and being provided along its surface facing away from said piston with longitudinal beads which are detachably arranged with respect to said slot to allow transversing of said power transmission element at a radially inward distance to said cylinder wall; and
    a spreading pin arranged at each axial side of said power transmission element and projecting in radial direction towards said sealing element, said spreading pin forcing said longitudinal beads of said sealing element apart from each other so as to attach said sealing element in said slot.

12. A cylinder device as defined in claim 11 wherein said longitudinal slot has a conical cross section expanding outwardly, said longitudinal beads being projecting ribs resting against said cylinder wall along its side faces defining said slot.

13. A cylinder device as defined in claim 11, and further comprising a steel band provided in said sealing element for reinforcing the latter.

14. A cylinder device as defined in claim 13 wherein said steel band is partly embedded within said sealing element.

15. A cylinder device as defined in claim 14 wherein said steel band has a width and said sealing lip has a width, said width of said sealing lip being smaller than said width of said steel band.

16. A cylinder device as defined in claim 13 wherein said sealing element has an innerside facing said piston, said steel band being attached to said innerside.

17. A cylinder device as defined in claim 16 wherein said steel band is attached to said innerside by vulcanization.

18. A cylinder device as defined in claim 13 wherein said steel band is exposed at its surface facing away from said piston, said power transmission element sliding along said exposed surface.

19. A cylinder device; comprising:
   a cylinder defining an axis and having a cylinder wall provided with a longitudinal slot extending in axial direction thereof;
   a piston reciprocating in axial direction within said cylinder;
   a power transmission element having one end portion connected to said piston and projecting with its other end portion radially through said slot beyond said cylinder wall; and
   a flexible sealing element for sealing said piston against said cylinder wall and being provided along its surface facing away from said piston with longitudinal beads which are detachably arranged with respect to said slot to allow traversing of said power transmission element at a radially inward distance to said cylinder wall, said cylinder wall having an outer surface provided with a longitudinal groove extending at both sides of said slot, each of said grooves being defined by one inclined side wall facing said slot, and further comprising guiding means for leading said power transmission element along said cylinder and including self-adjusting guide rails extending in each of said grooves and provided with opposing conical surfaces, each of said conical surfaces being pushed against said inclined side wall of the associated one of said grooves to prevent splaying of said slot.

20. A cylinder device as defined in claim 19 wherein said power transmission element is provided with a recess for supporting each guide rail, said guiding means further including a compression spring acting upon each guide rail and its end face remote to said one end section to continuously load said guide rails against said longitudinal grooves.

* * * * *